US008494480B2

(12) United States Patent
Aschauer et al.

(10) Patent No.: US 8,494,480 B2

(45) Date of Patent: Jul. 23, 2013

(54) TRIGGERING MECHANISM FOR AVALANCHE RESCUE DEVICES

(75) Inventors: Peter Aschauer, Gräfelfing (DE); Günter Hörcher, Kirchheim unter Teck (DE); Manuel Genswein, Meilen (CH)

(73) Assignee: Peter Aschauer, Grafelfing (DE)

( * ) Notice: Subject to any disclaimer, the term of this patent is extended or adjusted under 35 U.S.C. 154(b) by 462 days.

(21) Appl. No.: 12/663,966

(22) PCT Filed: May 15, 2009

(86) PCT No.: PCT/EP2009/003482

§ 371 (c)(1), (2), (4) Date: May 30, 2010

(87) PCT Pub. No.: WO2009/138244

PCT Pub. Date: Nov. 19, 2009

(65) Prior Publication Data

US 2010/0255809 A1 Oct. 7, 2010

(30) Foreign Application Priority Data

May 15, 2008 (DE) ........................ 10 2008 023 679

(51) Int. Cl.

*H04M 11/04* (2006.01)

*H04B 1/06* (2006.01)

(52) U.S. Cl.

USPC ........ 455/404.1; 455/404.2; 455/92; 455/352

(58) Field of Classification Search

USPC .............................. 455/404.1, 404.2, 92, 352

See application file for complete search history.

(56) References Cited

U.S. PATENT DOCUMENTS 4,702,715 A * 10/1987 Winick .......................... 441/80
5,649,466 A * 7/1997 Genovese ...................... 89/1.11
6,220,909 B1 4/2001 Aschauer et al.

(Continued)

FOREIGN PATENT DOCUMENTS

AT 366917 5/1982
CA 2 255 092 C 1/2004

(Continued)

OTHER PUBLICATIONS

Translation of the International Preliminary Report on Patentability, PCT/EP2009/003482, Dec. 6, 2010.

*Primary Examiner* — Wen Huang

(74) *Attorney, Agent, or Firm* — Bacon & Thomas, PLLC

(57) ABSTRACT

A release mechanism is provided for devices for rescuing persons from avalanches or indicating the position of persons within avalanches, and for reducing the extent to which persons swept away by avalanches are buried, the release mechanism being able to be triggered by an intrinsic manual actuation. The release mechanism includes a radio unit equipped with a power supply, a transmitter, a receiver, an antenna, and data processing means, and can receive a radio signal for actuating the intrinsic release mechanism from the radio unit of at least one further release mechanism. The radio unit is either an integral component of the release mechanism or an additional, separate element which is however operatively connected or can be detachably connected thereto. The release mechanism is provided with an actuation means which is able to induce an extrinsic actuation of the intrinsic release mechanism upon receiving a radio signal.

16 Claims, 5 Drawing Sheets

U.S. PATENT DOCUMENTS

| | | | | |
|---|---|---|---|---|
| 7,270,077 | B2 * | 9/2007 | Beck | 116/210 |
| 2002/0175851 | A1 | 11/2002 | Schaumann et al. | |
| 2006/0035622 | A1 * | 2/2006 | Kampel et al. | 455/404.2 |
| 2006/0141960 | A1 * | 6/2006 | Fernandez et al. | 455/127.1 |
| 2007/0123121 | A1 * | 5/2007 | Quintero | 441/6 |
| 2008/0282453 | A1 * | 11/2008 | Alstin et al. | 2/413 |

FOREIGN PATENT DOCUMENTS

| | | | |
|---|---|---|---|
| DE | 3237060 | A1 | 4/1984 |
| DE | 197 03 656 | A1 | 8/1998 |
| DE | 100 37 789 | A1 | 2/2002 |
| EP | 0957995 | A1 | 11/1999 |
| FR | 2 866 241 | A1 | 5/2005 |
| WO | 2005/110546 | | 11/2005 |

* cited by examiner

TRIGGERING MECHANISM FOR AVALANCHE RESCUE DEVICES

FIELD OF INVENTION

The invention relates to a release mechanism for devices for rescuing persons from avalanches or indicating the position of persons within avalanches, and for reducing the extent to which persons swept away by avalanches are buried, said release mechanism being able to be triggered by an intrinsic manual actuation.

BACKGROUND various devices for rescuing persons from avalanches (in the following also designated as avalanche rescue devices) are already known. Moreover, various devices are known which indicate the position of a person buried in an avalanche.

An avalanche rescue device is described for example in the German patent document P 32 37 060, and comprises a rescue backpack having two chambers, each of which contains a balloon which is filled by means of a gas-air mixture from pressurized gas containers. The inflated balloons cause the user, when he/she is swept along in an avalanche, to be subjected to a buoyant force and virtually be carried on the surface of the avalanche.

A further avalanche rescue device based on this principle is known from the Austrian patent document 366917.

Another device of this generic type is known from the European patent document EP 0 957 995, in which it is designated an avalanche air bag.

Various devices are furthermore known for indicating the position of persons in avalanches. There is, for example, a so-called avalanche ball. This is a device that the user straps on over his/her backpack. When this device is triggered, a structure separates which mechanically deploys like a Chinese lantern. An avalanche cord of an extended length is affixed to this Chinese lantern and, in turn, is connected to the user. Since this Chinese lantern will buoy upward in an avalanche's snow mass, this should enable being able to quickly visually locate a person buried in the avalanche.

What all these mechanisms and devices have in common is that they have to be released or actuated by the wearer, respectively user. This is usually done manually by the user initiating a release mechanism, for example by striking an airbag, and thus by impact actuation. In the context of the present documents, the term "release" is understood to be an actuation of an avalanche rescue device, respectively a device for indicating the position of persons in avalanches, whereby the respective device is set into a state in which it is able to exercise its rescue function or its position-indicating function.

There are essentially two problems associated with the user releasing an avalanche rescue device or a position-indicating device (this will be designated in the following as intrinsic actuation or self-release). On the one hand, the person concerned must recognize that he/she has already been caught by or is just about to be caught by an avalanche. A release must then of course take place as immediately as possible.

If the person concerned has already been caught by an avalanche and/or has already been swept down, then he/she must be capable of effecting the self-release, respectively intrinsic actuation, in the midst of the dynamics of the avalanche rushing downhill.

In practice, there have been multiple cases in which persons outfitted with an avalanche rescue device, respectively a position-indicating device, were no longer able to release the device they were wearing. Thus, numerous avalanche accidents have occurred in which the persons caught in the avalanche have lost their lives, although they were equipped with an avalanche rescue device but were no longer able to release same.

SUMMARY

The task of the present invention is to disclose a way in which another person can effect a controlled extrinsic release of an avalanche rescue device, respectively a device for indicating the position of persons within an avalanche.

This task is solved by a release mechanism for the devices discussed here, which comprises a radio unit equipped with a power supply, a transmitter, a receiver, a data processing means and, if necessary, an antenna, and which can receive a radio signal for actuating the intrinsic release mechanism from the radio unit of at least one further release mechanism, wherein the radio unit is either an integral component of the release mechanism or an additional, separate element which is however operatively connected or can be detachably connected thereto. Moreover, the release mechanism is provided with an actuation means which is able to induce an extrinsic actuation of the intrinsic release mechanism upon receiving a radio signal.

This release mechanism must be capable of receiving a radio signal emitted by the radio unit of another release mechanism via its own intrinsic radio unit so that an actuation of the device equipped with this release mechanism, and hence the device associated with same, is enabled by an extrinsic, respectively third person (extrinsic actuation). The actuation mechanism is thus activated upon receiving said radio signal, provided this is allowed pursuant the selected switching states/functional states, whereby the device associated with the release mechanism is actuated without a manual actuation of the release mechanism occurring.

The inventive release mechanism, respectively radio unit, must be able to have or assume at least the following switching states, respectively functional states:

a1) only activating its own intrinsic release mechanism upon an intrinsic manual actuation, and b1) enabling an extrinsic actuation of its intrinsic release mechanism by a radio signal received from a further release mechanism (to be more precise: the radio unit of this further release mechanism).

The release mechanism, radio unit respectively, is preferably configured such that it can transmit a radio signal to at least one further release mechanism for actuating the latter's release mechanism. The radio unit of the inventive release mechanism hence must be capable of sending a radio signal to the corresponding radio unit of a further release mechanism for extrinsically actuating the other, further release mechanism.

In this preferred embodiment, the inventive release mechanism, radio unit respectively, may have or may assume at least the following switching states/functional states.

In the switching state a1), only the intrinsic release mechanism is actuated upon an intrinsic manual actuation. No radio signal is sent to a further release mechanism. The person exercising the intrinsic actuation hence only causes the actuation of that specific release mechanism which he/she is wearing, and hence also that of the device he/she is equipped with and wearing.

In the second switching state a2), the intrinsic release mechanism is on the one hand actuated upon an intrinsic manual actuation. In addition, a radio signal is transmitted to a further release mechanism and thus to a further device.

Regardless of whether the a1) or a2) switching state is selected, it is therefore always possible for the person wearing the corresponding release mechanism to effect an intrinsic actuation and thus to actuate or trigger the release mechanism he/she is wearing.

Irrespective of the two switching states a1) and a2), the radio unit can preferably also assume a switching state b2) in addition to the switching state b1).

In the b1) switching state, an extrinsic actuation of the intrinsic release mechanism—also see above—is also possible by means of a radio signal received from a further release mechanism. In this state, the release can hence take place both by the intrinsic manual actuation as well as by radio actuation.

In the b2) switching state, an extrinsic actuation of the intrinsic release mechanism is not possible by means of a radio signal received from a further release mechanism. For example, if another release mechanism emits a radio signal for extrinsic actuation, this signal will be disregarded when in switching state b2).

The radio unit of the inventive release mechanism may be an integral component of said release mechanism or an additional separate element which is however operatively connected or can be detachably connected thereto.

In the first case, the release mechanism preferably exhibits a handle in which not only the functional parts serving to manually actuate the release mechanism are accommodated, but also those elements associated with the functioning of the radio unit. Among the latter are the transmitter, the receiver, the power supply as well as associated switches and lines. If necessary, an antenna may be integrated into or connected to the release mechanism.

If the radio means is configured to be separate, it will be appropriately connected to the release mechanism by means of a cable. The radio unit may in this case also be termed an electronics box; the release mechanism moreover preferably exhibits a handle. An electric line for activating the actuating means, a line for the power supply of this actuating means if necessary, and the antenna as appropriate are accommodated in the cited cable. This separate radio unit, electronics box respectively, may thus be attached to the body of the user or to a part of the device respectively, for example a retaining strap, situated at some distance from said release mechanism.

It is not absolutely imperative for all the functional parts of the radio unit, including those elements which display the selected functional state, to be housed within the separate radio unit or electronics box. Those display means which are of an optical (e.g. LEDs) or acoustical nature, for example, may be disposed in the release mechanism, whereas the power supply is in particular then housed in the separate radio unit or electronics box when it is a battery or accumulator. Neither do the switches and display means to be described later necessarily need to be arranged in the separate radio unit. They can also be provided in the release mechanism. The distribution of the individual functional parts, devices and means may be selected as a function of need and requirement. Among other things, this also applies to the data processing means described below. For this reason, reference is frequently made to "release mechanism or radio unit" within the scope of the present documents, in particular in the following claims. This is intended to express that the features associated with said "release mechanism or radio unit" may be distributed or accommodated in the meaning described above.

The tube is appropriately detachable from and reconnectable to the release mechanism as well as the radio unit. This allows the inventive release mechanism to also be used without a radio unit, for example when radio actuation of a further release mechanism is not required or desired.

A data processing means serves to control these operations and also controls the optical display means, if provided, as well as assuming other regulating tasks. Such data processing means may be a chip programmed according to needs, for example. The manufacturing and programming of such chips is known so that a further explanation here would be superfluous.

The radio-controlled actuating means of the inventive radio unit, respectively release mechanism, appropriately serves the purpose of actuating those functional parts which are moved and/or activated in a manual actuation by the application of "manual energy" by means of applying electricity or pressurized air, or by means of another pneumatic approach. This actuating means is preferably arranged in the release mechanism.

A sensor operatively connected to the data processing means also forms a part of the release mechanism and detects when the release mechanism is intrinsically actuated. The sensor transmits this information to the data processing means which then, depending on the set switching state, transmits, or does not transmit, a radio signal to the radio unit of a further release mechanism.

Persons who set out into avalanche-prone areas (the term avalanche to be mainly understood as a snow avalanche in all which is to follow here) are in most cases touring skiers skiing in a group. Such a group is often accompanied by a mountain guide.

Prior to starting the ski tour, the release mechanisms of the different participants of the tour are set to the desired switching state. For example, it is reasonable for the mountain guide, once he/she activates an intrinsic actuation and thus his/her own release mechanism and thereby his/her own device, to simultaneously activate the release devices of some or all of the persons he/she is guiding and thus effect an extrinsic actuation for these people. After all, the mountain guide has the most experience and can judge the situation best.

For example, even when the mountain guide is not actually caught up in an avalanche and only some persons of his/her group are swept away by an avalanche, he/she can simultaneously cause an extrinsic actuation of the release mechanisms of those persons swept into the avalanche by his/her own intrinsic actuation. It is thereby irrelevant if his/her own device is also triggered. This is something which just has to be accepted as a matter of course since the intrinsic manual actuation of one's own release mechanism always entails an actuation of the device associated with said release mechanism.

In addition, the mountain guide's release mechanism should assume the b2) switching state so as to avoid having the mountain guide's device be erroneously activated by an intrinsic actuation of the release mechanism of a person being guided by the mountain guide.

Therefore, the mountain guide's radio unit is preferably in the a1) and b2) switching states. The radio units of the persons he/she is guiding are preferably in the a1) and b1) switching states.

When a group is accompanied by two mountain guides having equal rights with respect to the release mechanisms, these two mountain guides may select the a2) and b1) switching states. Once one of the mountain guides activates his/her release mechanism (=intrinsic actuation), he/she will extrinsically actuate the release mechanisms of the people in the group led by the two mountain guides. The release mechanism of the second mountain guide, however, will not be extrinsically actuated by the first mountain guide.

This thus allows the inventive release mechanism to be variably adapted to the requirements of a group of touring skiers.

According to a preferred embodiment, the release mechanism or radio unit of the inventive release mechanism is provided with a first switch for setting the two switching states a1) and a2), and a second switch for setting the two switching states b1) and b2). In this manner, the a1) and a2) switching states may be selected independent of the b1) and b2) switching states.

According to a further preferred embodiment, the release mechanism or radio unit of the inventive release mechanism is provided with a push-button switch. By means of this push-button switch, the data processing means, respectively the chip provided in the release mechanism, can be programmed.

The selected switching states are preferably indicated by the position of the switches and/or by an optical display means, for example a light source such as an LED.

According to a further preferred embodiment, the release mechanism or radio unit is provided with a securing means which is capable of locking the switches in the set position. In other words, the switch position can only be changed by releasing the securing means. This is to ensure that the position of the switches or the selected switching states are not changed inadvertently when the avalanche rescue device or the avalanche position-indicating device is worn by the user. Such a securing means may be of a mechanical or electrical, respectively electronic, nature, for example a code to be input.

According to a preferred embodiment, the radio unit may receive a first additional radio signal from a further, respectively another radio device which does not form a part of a further release mechanism but instead constitutes an separate element from a release mechanism, which is located, for example, in a helicopter or a mountain but and is actuated by an appropriate person as soon as this person reaches the conclusion that an extrinsic actuation of a release mechanism is advisable. This may be the case, for example, when this person observes or suspects an avalanche flow, and the members of the touring group and/or the mountain guide have/has not yet recognized this risk or any corresponding danger.

The extrinsic actuation takes place as soon as the radio unit of the release mechanism receives this additional radio signal.

Preferably, the radio unit is equipped for this case such that an extrinsic actuation occurs independently of the switching state b1) or b2). This can be achieved by selecting a frequency for this first additional radio signal which differs from the frequencies used by the radio units and the other radio device for the blocking, respectively unblocking of the blocking. Of course, the electronic components of the radio unit, the data processing means and the radio device must be configured correspondingly so as to be able to transmit or receive over different frequencies and to trigger or initiate the desired technical consequence.

Preferably, the radio unit can receive a second additional radio signal from the other radio device. Upon receiving this second additional radio signal, the radio unit will block the actuation means and/or the intrinsic manual actuation, or will unlock such a blocking provided one is set.

Such a further radio device may be located, for example, in a helicopter intending to drop a touring group at a starting point for downhill skiing in deep snow. In order to prevent any avalanche rescue device from being inadvertently released during the approach and drop-down, the pilot will block the radio units of his group by means of the further radio device. As soon as he has reached a sufficient distance from the drop-down point, the pilot will “reactivate” the radio units and thereby remove the blocking. Such a radio signal will appropriately be sent and received at another frequency than the radio signal for the extrinsic actuation of the release mechanisms.

The terms “first additional radio signal and second additional radio signal” as used here do not indicate an order of priority or weighting but have merely been chosen to better differentiate between the different radio signals in the written representation.

The inventive release mechanism is preferably provided with an additional holding and securing means attachable to a device for rescuing or for indicating the position of persons in avalanches, and for reducing the extent to which persons swept away by avalanches are buried, or to the person actually wearing the release mechanism, and may assume at least two positions, namely a secured position, in which it encloses the release mechanism such that same can no longer be grasped and actuated manually, and an actuating position, in which the release mechanism may be grasped and actuated manually. This holding and securing means can, for example, be a strap.

The holding and securing means and the release mechanism are each preferably provided with a blocking means and interact in the secured position such that the radio device is blocked or switched off. The blocking means is preferably a magnet which comes to rest on a therewith cooperating electronic component in the release mechanism, in particular a “reed contact.”

According to a further preferred embodiment, the inventive release mechanism is integrated into a device for rescuing persons in avalanches as pursuant European Patent 0 957 995.

BRIEF DESCRIPTION OF THE DRAWINGS

In the following, the invention will be explained in greater detail on the basis of exemplary simplified drawings, not drawn true to scale. The figures thereby show.

DETAILED DESCRIPTION OF VARIOUS EMBODIMENTS OF THE DISCLOSURE

Figure 1:
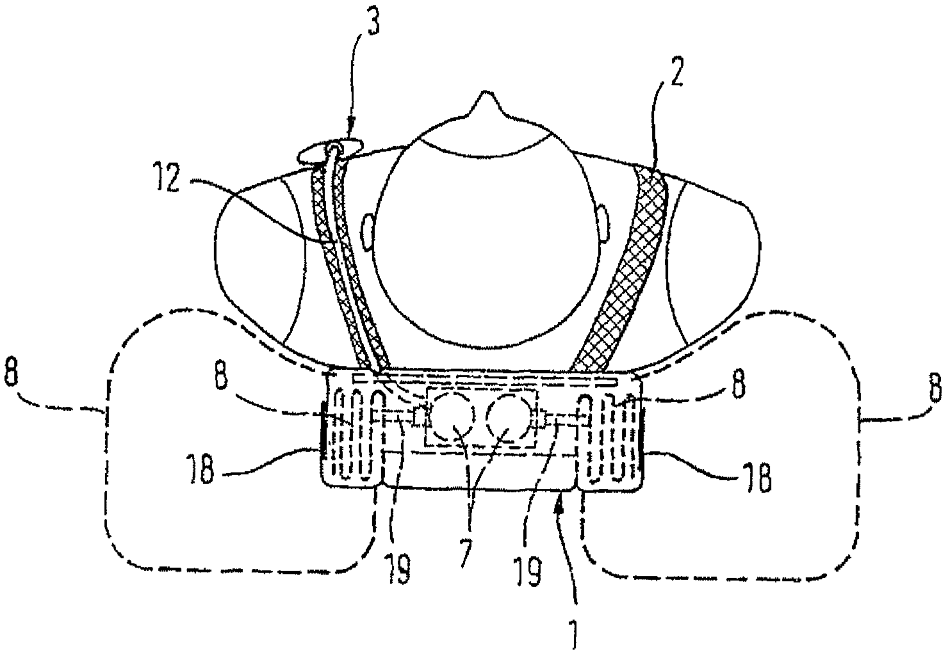
FIG. 1 a device for rescuing or indicating the position of persons in avalanches, and for reducing the extent to which persons swept away by avalanches are buried, in a top plan view, FIG. 2 a section view through the release mechanism 5 shown in FIG. 1 in the form of a handle, FIG. 3 a side view of the release mechanism shown in FIG. 2, FIG. 4 a schematic view of an inventive release mechanism with a separate radio unit or electronics box, FIG. 5 a side view of a further embodiment of a release mechanism including a holding and securing means in the non-secured position or actuating position, and FIG. 6 a front view of the release mechanism shown in FIG. 5 and the holding and securing means also shown in FIG. 5, in the secured position.

FIG. 1 shows a top plan view of a device 1 for rescuing or indicating the position of persons caught in avalanches, and for reducing the extent to which persons swept away by avalanches are buried (also termed rescue backpack in the following). A person wears this rescue backpack 1 secured in place on his/her body by means of a shoulder strap 2, a not shown belt and two likewise not shown leg straps. The rescue backpack 1 contains a not shown filling device for two pressurized gas containers 7 and two folded balloons 8 arranged at the sides of the backpack, i.e. behind its side walls 18. The two balloons 8 are connected via lateral pressure ducts 19 to the filling device which can, in turn, be actuated by a release mechanism 3.

This release mechanism 3 in the form of a handle is located chest-high on the user's left shoulder strap 2. The release mechanism 3 is connected to the filling device via an actuating tube 12.

When the release mechanism 3 is actuated, the folded balloons 8 are inflated in a manner described in greater detail below, whereby they can deploy toward the side and bulge out from the side walls 18 by rupturing through not shown slots until they are fully filled. These fully-filled balloons are shown in FIG. 1 by dashed lines.

Such a rescue backpack 1 is already described in the European Patent Application 96919725.0 (EP 0 957 995 A1). Reference is herewith explicitly made to the disclosure of this European patent application; the content thereof being incorporated into the present application by reference.

The release mechanism 3 according to the invention and described below in greater detail is incidentally not limited to the use with the herein discussed rescue backpack 1. Said release mechanism 3 can in fact be combined with any devices of the type discussed herein. This applies in particular to rescue backpacks having only one pressurized gas container and two balloons. Such a rescue backpack or such an avalanche rescue device is the object of European Patent Application 98908020.5 (EP 0 957 994 A1), reference herewith being made to its disclosure, and its disclosure being is incorporated into the present application by making reference thereto.

Figure 2:
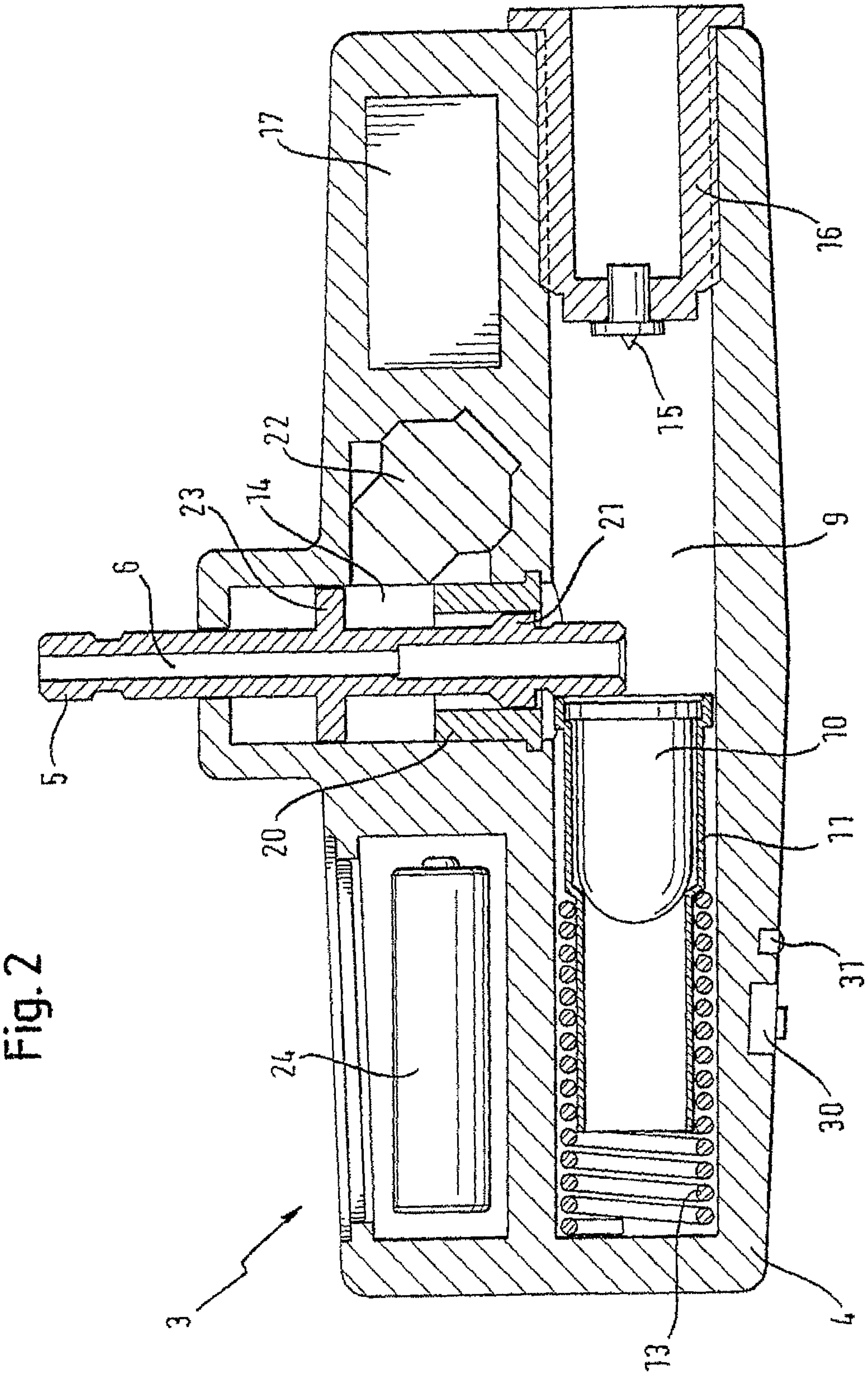

FIG. 2 shows a section through the release mechanism 3 in the tensioned, respectively operative/active state.

Figure 3:
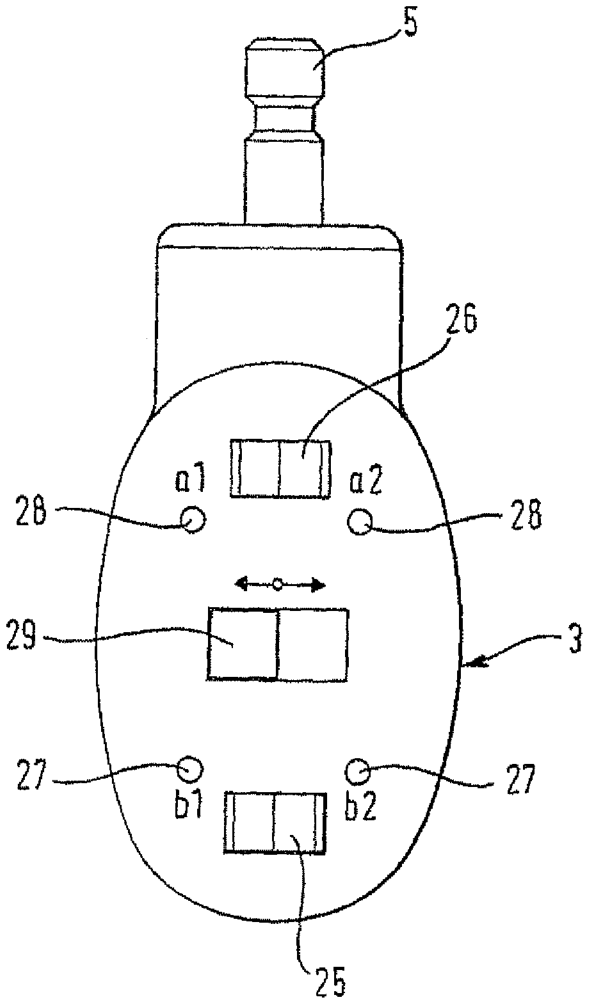

In a side view, the release mechanism 3 constitutes a handle somewhat approximating a T-shape. The crossbar of this T-shape constitutes a housing 4 in which the functional parts of the release mechanism 3 are arranged. This crossbar has an approximate oval cross-sectional shape, cf. FIG. 3.

The release mechanism can be detachably connected or coupled to the actuating tube 12 via a hollow pin 5 extending in the perpendicular bar of the T-shape.

The hollow pin 5 comprises a through-bore 6 which opens in the interior into a hollow-cylindrical inner space 9, the longitudinal axis of which extends approximately perpendicular to the hollow pin 5.

A blank cartridge 10 supported in a carriage 11 is arranged in the inner space 9. This carriage 11 is of sleeve-like configuration and has two sections of differing inner diameters. The blank cartridge 10 is located in the section having the larger inner diameter, while the section having the smaller inner diameter is empty. The carriage 11 is inserted into the interior of a helical-type spiral spring 13 by its section of smaller diameter. This spring 13 is shown in FIG. 2 in the tensioned, respectively compressed state and supported on the left face wall of the inner space 9 on the one hand and, on the other, at a shoulder on the carriage 11 at the transition from the section or area of smaller diameter to the section or area of larger diameter.

The carriage 11 is in turn supported on the hollow pin 5 extending into the interior of inner space 9 at its end facing away from the spring.

The hollow pin 5 is guided in a cylindrical space 14 extending perpendicular to the inner space 9 to be displaceable in the axial direction.

Upon a manual triggering of the release mechanism 3, for example by the user of the rescue device 1 pulling on the release mechanism 3, the hollow pin 5 is pulled out a certain length from the release mechanism 3. As a consequence, the end of the hollow pin 5 protruding into the inner space 9 is pulled out from said inner space 9. The carriage 11 is thereby released and, due to the pressure exerted by the spring 13, can shoot toward a mandrel 15, which is held by an insert 16 that closes the end of the inner space 9 opposite the spring 13 to the outside. The inner space 9 is thus open on one side (on the right-hand side in FIG. 2) and is closed by the insert 16 which is inserted and fixed in position for example by screwing it into the inner space 9.

The blank cartridge 10 detonates when it strikes the mandrel 15. The shock wave thereby released is guided through the hollow pin 5 and into the actuating tube 12, which constitutes a pressure tube. A 9 mm blank cartridge filled with gunpowder, for example, may be used as the blank cartridge 10.

Incidentally, such a mechanical release mechanism is already the object of the above-mentioned document EP 0 957 994 A1.

The release mechanism 3 can be actuated not only mechanically but also by means of a radio signal. For this purpose, a radio unit 17 provided with a transmitter and a receiver, and if required an antenna, is additionally arranged in the release mechanism. A battery 24, which can be a commercial 9V block battery, provides the power supply. This battery 24 is housed in a compartment or cavity within the release mechanism 3 which is accessible from the outside and can be closed by a cover.

The electric components or modules of such a radio unit 17 are known. Therefore, these components are not illustrated separately.

Upon receiving a radio signal from a further radio unit, an actuating unit arranged within the release mechanism 3 in the form of an ignition unit 22 is actuated, which then ejects a gas causing a shock wave to develop. This gas flows into the cylindrical space 14.

The outside of the hollow pin 5 is provided with a radially circumferential annular collar 23 which is arranged inside the cylindrical space 14 in a piston-like manner.

The ignition unit 22 is arranged in the release mechanism 3 such that the gas exiting therefrom upon actuation flows into the area of the cylindrical space 14 situated between the annular collar 23 and the end of said cylindrical space 14 facing the inner space 9.

Furthermore, the release mechanism is configured such that the ignition unit 22 is exchangeable. This can be achieved by arranging the ignition unit 22 in a compartment or cavity (not shown in detail) in the release mechanism 3, said compartment or cavity being accessible from the outside and which can be closed by a cover.

At the hindmost end of the cylindrical space 14 facing the inner space 9, a cylindrical annular sleeve 20 is inserted into the cylindrical space 14. In this area, the hollow pin 15 has a wider, radially outer circumferential annular collar 21 of smaller outer diameter than the annular collar 23 and seals the hollow pin with respect to the inner wall of the cylindrical annular sleeve 20. This annular collar 21 thus constitutes a kind of piston ring.

When the gas originating from the ignition unit 22 flows in, since the active area provided by annular collar 23 is larger than that of annular collar 21, the hollow pin 5 is moved to the outside by the force exerted by annular collar 23 and against the force exerted by annular collar 21. In other words, the gas originating from the ignition unit 22 is guided into the cylindrical space 14 in the area between annular collar 23 and annular collar 21 and pushes the hollow pin 5 in the direction of the perpendicular leg of the T-shape to the outside.

As soon as the hollow pin 5 has been pushed outside, the carriage 11 is released, just as in the manual actuation described above, and the release mechanism 3 is actuated.

The release mechanism 3 is also provided with a sensor (not shown), which responds when the release mechanism 3 has been actuated. This sensor may be an electrical sensor which responds when the hollow pin 5 has been moved outside the inner space 9. Such a sensor may be an electrical contact which is actuated by the hollow pin 5. It can also be a pressure sensor which responds when the ignition unit 22 has been actuated and the cylindrical space 14 has been pressurized with pressurized gas.

The release mechanism 3 hence comprises two means, namely a manual release mechanism including those functional parts which are necessary for the manual release, and a radio means including those functional parts which effect a release per radio (=extrinsic actuation). Some of these functional parts are thereby jointly used by both means/devices or are an integral part of both means/devices. In addition, an actuating means is provided which is activated by radio trigger, provided doing so is allowed.

Two tumbler switches 25 and 26, which can assume two positions, are provided at the left front side (referring to FIG. 2) of the housing 4. The tumbler switch 25 can thus assume the positions b1) and b2), for example. In the b2) position, a switching state is selected which does not allow an extrinsic actuation of the release mechanism by radio signal received via the radio unit, whereas in the b1) position, such an extrinsic actuation is possible. In addition, the selected state will be indicated by one of the LEDs 27.

Both of the a1) and a2) switching states may be selected via the tumbler switch 26. The a1) switching state only allows an intrinsic manual actuation of the release mechanism. Any radio signal received from another release mechanism will be disregarded, respectively a release per radio will not occur.

In the a2) switching state, both an intrinsic manual actuation of the release mechanism as well as an actuation by a radio signal received via the radio unit are possible. The two switching states are indicated by the LEDs 28.

A slide switch 29 which can be shifted into two positions is mounted between the two tumbler switches 25 and 26. One position allows a tilting of the tumbler switches 25 and 26, whereas in the other position, the two tumbler switches 25, 26 are locked in the selected tilted state. This slide switch 29 thus constitutes a securing means.

The housing 4 further incorporates an ON/OFF switch 30 at its front side (at the lower part of FIG. 2), by means of which the radio unit of the release mechanism 3 can be turned on and off. In the ON state, an LED 31 arranged next to this switch 30 is illuminated.

Figure 4:
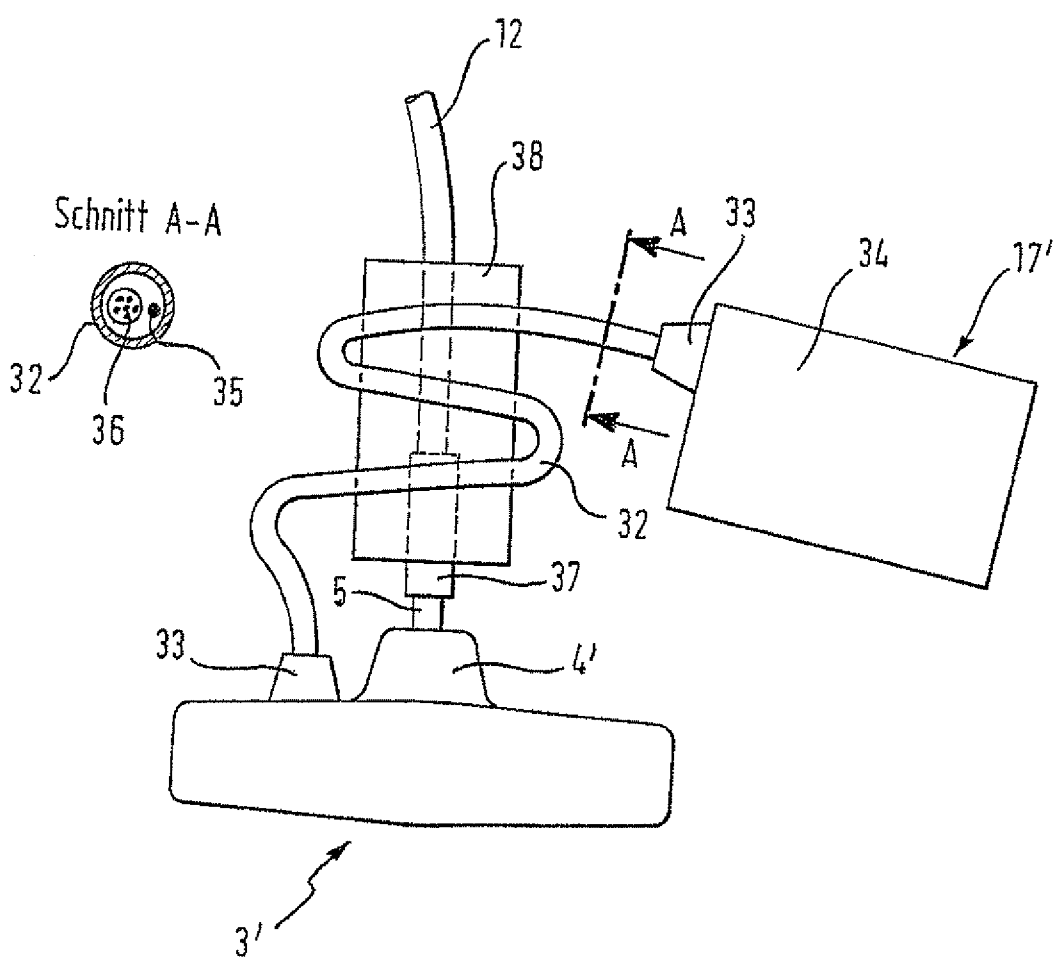

FIG. 4 shows a top view of a release mechanism in which the radio unit 17' is arranged separately from the release mechanism 3', whereby the two are connected by means of a flexible cable duct 32 provided at both ends with a mechanical strain relief 33. This cable duct 32 may be detached from as well as reattached to both the release mechanism 3' and the radio unit 17'.

All the functional parts required for a manual actuation are accommodated in the housing 4' of the release mechanism 3'. These parts have already been discussed above in conjunction with FIG. 2. An actuation means comprising an ignition unit 22 is also arranged in the housing 4'.

On the other hand, however, the functional parts of the radio unit 17' are at least in part arranged in a housing 34, which may also be designated an electronics box. These functional parts include a transmitter, a receiver, a chip and the power supply, for example. A multicore cable 36 and an antenna 35 extend within the cable conduit 32 from the radio unit 17'. The cable 34 is connected inter alia to the ignition unit 22 in the release mechanism 3', respectively in the handle 4'. Once the radio unit 17' receives a radio signal, the ignition unit 22 and thus also the release mechanism 3 is actuated via this cable 34.

The tumbler switches, slide switch, ON/OFF switch and optical display means described above in conjunction with the release mechanism 3 or the housing 4, are arranged, respectively mounted, on the upper side of the housing 34 in this embodiment (not shown).

The A-A section shown in FIG. 4 illustrates a cross-sectional view of the cable duct 32.

The release mechanism 3', respectively the housing 4' thereof, is connected to the actuating tube 12 through the hollow pin 5 protruding out from the housing 4' by means of a connector socket 37. The connector socket 37 and the cable duct 32 are connected to a not shown strap by means of a connection element 38.

Figure 5:
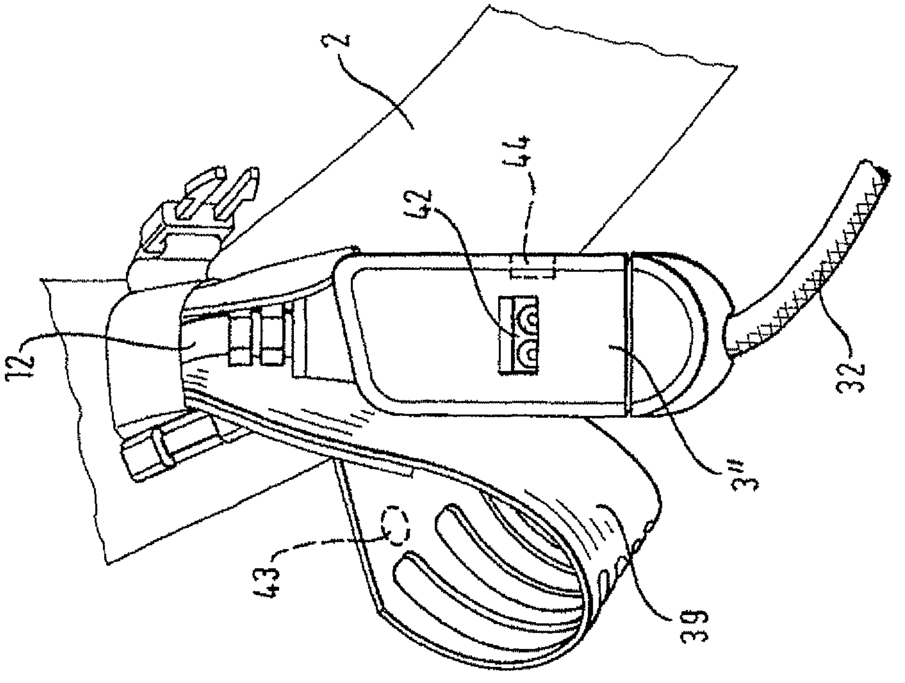

A further embodiment of a release mechanism 3" according to the invention is shown in a side view in FIG. 5. This release mechanism 3" is connected to an avalanche rescue device 1 or the like via an actuating tube 12. This actuating tube 12 is affixed to a shoulder strap 2.

In addition, a holding and securing means 39 is attached to the shoulder strap 2. In the illustrated case, this means is a flexible flap 39 made of a plastic material. The central area of the flap 39 (as viewed in a top view) has the approximate shape of an oblong rectangle. The two narrow sides of the rectangle give way to a triangular shape (as likewise viewed in a top view). The flap 39 can be attached to strap 2 at the pointed ends of these triangular shapes.

In the rectangular area, the flap 39 comprises a plurality of recesses 41 running parallel to each other and extending in the longitudinal direction of the rectangle, which increases the flexibility of the flap 39. While it is true that these recesses 41 are not imperative, they are preferred when the flap 39 is made of a plastic sheet or a thin plastic slab.

In the arrangement shown in FIG. 5, the release mechanism 3" is in the non-secured position, respectively the actuating position. In this position, a user can grasp the release mechanism 3". If the user pulls on the release mechanism 3", the device connected thereto will then be activated.

In this actuating position, the flap 39 is bent or folded away from the release mechanism 3".

Figure 6:
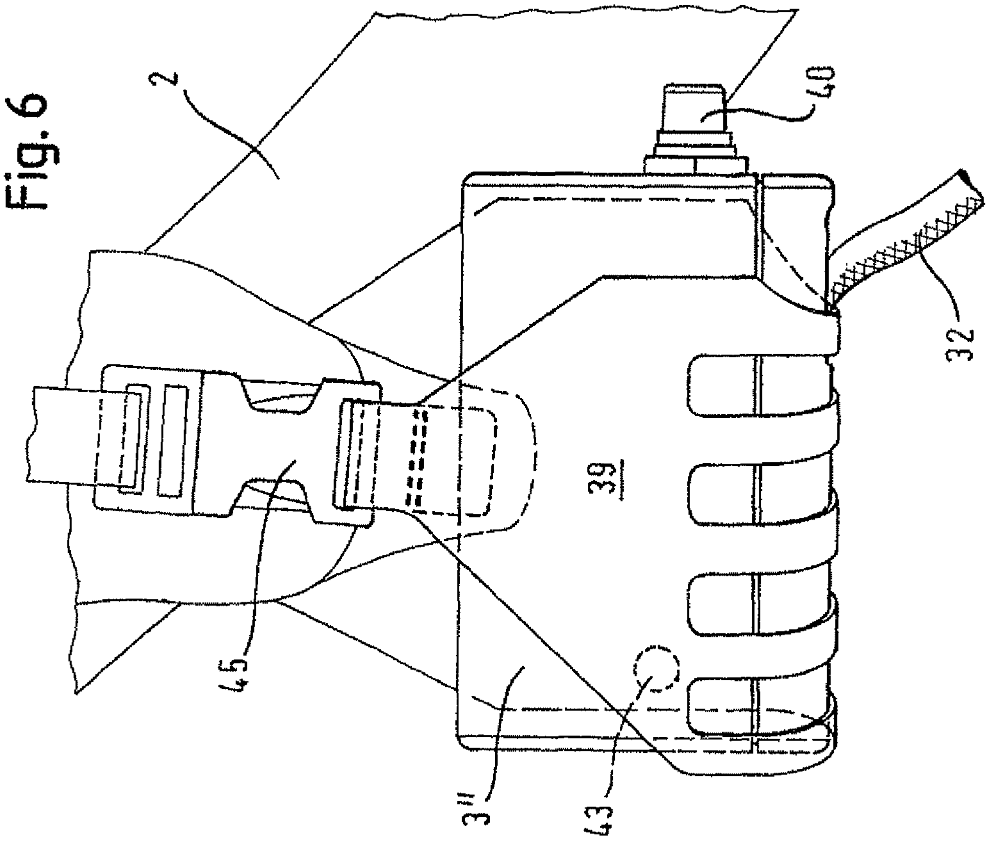

In FIG. 6, which shows a top view of the release mechanism 3" depicted in FIG. 5, the flap 39 is in the secured position. To attain this secured position, the flap 39 shown in FIG. 6 is pivoted, respectively folded around the release mechanism 3" so that the release mechanism 3" comes to rest within the loop formed by the flap 39. The two ends of the flaps 39 (to be more precise, the two pointed ends of the triangles set forth above) are both attached to the shoulder strap 2, the end of the flap 39 situated at the front in FIG. 6, and thus facing the viewer, is attached to the shoulder strap 2 by means of a belt buckle 45. The other end of the flap 39 may be attached both detachably and permanently to the shoulder strap 2.

In the secured position shown in FIG. 6, the user cannot grasp the release mechanism 3" so as to pull the release mechanism 3" and thus activate it as already described several times above.

The cable 32 of the release mechanism 3" shown in FIGS. 5 and 6 fulfills the same functions as the cable duct 32 of the embodiment shown in FIG. 4, cf. the associated explanations given above. The radio unit with the transmitter and receiver and the power supply are housed in a separate electronics box (not shown in FIGS. 5 and 6) which is connected to the release mechanism 3" via the cable 32. The chip, respectively the data processing means, is either arranged in the release mechanism 3" or the electronics box. The power supply line for the electrically-operated elements arranged in the release mechanism 3", e.g. the transmission device 42 described further below and the optical and acoustical display or indicating means, are also disposed in the cited cable 32. One or more data line(s) are furthermore situated in the cable as required.

The release mechanism 3" shown in FIGS. 5 and 6 comprises a switch for programming, namely a push-button switch 40. This push-button switch 40 is mounted on the right front side of the release mechanism 3" (cf. FIG. 6).

The release mechanism 3" or the associated data processing means, respectively chip, may be programmed via this push-button switch 40. Such a programming, for example, may be effected by the number of the pressing movements and the duration of each pressing movement. The selected, respectively programmed state is indicated by optical and/or acoustical display or indicating devices, e.g. LEDs (not illustrated).

It is also possible to transmit a programmed state to a further, not shown release mechanism via a transmission means 42 arranged at the front side of the release mechanism 3" opposite the push-button switch 40. The transmission ensues in this case per radio. During the transmission, the two release mechanisms are held as close together as possible so that the transmission means, which thus comprises a transmitter and a receiver, may be operated at low power.

If a ski touring group is accompanied by a mountain guide, for example, the mountain guide can use his/her own release mechanism to transmit to the release mechanisms of the other persons that state, respectively functional state, which the release mechanisms of the persons he/she is guiding have to adopt. For this purpose, the transmission means of the release mechanisms of the other persons are held close to the transmission unit 42 of the mountain guide's release mechanism 3". Doing so ensures that the other release mechanisms have the functional state that the mountain guide desires. The mountain guide's release mechanism 3" will then constitute the "master," whereas the release mechanisms of the other persons will be the "slaves." Of course, the mountain guide may then select another functional state for himself/herself than that which he/she has "given" the release mechanisms of the persons he/she is guiding.

The flap 39 holds a magnet 43 which, when the flap 39 is folded, is situated on that surface which will come to rest on the outer surface of the release mechanism 3". The position of this magnet 43 is outlined in FIGS. 5 and 6. With respect to FIG. 6, this means that the magnet 43 is on the side facing away from the paper and thus on that side of the flap 39 facing the release mechanism 3".

This magnet 43 interacts with an electronic component 44 in the release mechanism 3". This electronic component constitutes a reed contact 44. In the secured position (FIG. 6), the magnet 43 comes to rest on the outer surface of the release mechanism 3" at approximately that area where the reed contact 44 is located. In this secured position, the release mechanism 3" is protected from more than just manual grasping (see above). The magnet 43 along with the reed contact 44 in fact constitute a blocking means. When this blocking means is active (the magnet 43 and the reed contact 44 lie upon each other), the desired functions are then switched off. The entire remote release system may thus be deactivated, for example.

LIST OF REFERENCE NUMERALS

1 device for rescuing or indicating the position of persons in avalanches, and for reducing the extent to which persons swept away by avalanches are buried
2 shoulder straps
3, 3', 3" release mechanism
4, 4' housing
5 hollow pin
6 through-bore
7 pressurized gas container
8 balloon
9 inner space
10 blank cartridge
11 carriage
12 actuating tube
13 spring
14 cylindrical space
15 mandrel
16 insert
17, 17' radio unit
18 side wall
19 pressure duct
20 cylindrical annular sleeve
21 annular collar
22 ignition unit
23 annular collar
24 battery
25 first switch/tumbler switch
26 second switch/tumbler switch
27 optical display means/LED
28 optical display means/LED
29 slide switch
30 ON/OFF switch
31 LED
32 cable duct
33 strain relief
34 housing/electronics box
35 antenna
36 multicore cable
37 connector socket
38 connecting element
39 holding and securing means/flap
40 push-button switch
41 recess
42 transmission means
43 magnet
44 reed contact
45 belt buckle

The invention claimed is:

1. A release mechanism configured to release at least one inflatable device from a rescuing device the release mechanism comprising:

an intrinsic actuation mechanism configured to be triggered by an intrinsic manual actuation of the release mechanism to release at least one inflatable device from a rescuing device, a radio unit equipped with a power supply, a transmitter, a receiver, and a data processing device, said radio unit configured to be either integrally mounted to the release mechanism or an additional, separate element which is connectable or detachably connected thereto, and an extrinsic actuation mechanism configured to induce an extrinsic actuation of the release mechanism upon receiving a radio signal via the radio unit so that the at least one inflatable device is released from the rescuing device, wherein the release mechanism, and respectively the radio unit, are configured to have at least the following switching states:

a1) the intrinsic actuation mechanism upon an intrinsic manual actuation only activates the intrinsic actuation mechanism of the release mechanism, and b1) the extrinsic actuation mechanism activatable by an extrinsic actuation from a radio signal received from at least a second release mechanism.

2. The release mechanism according to claim 1, wherein the radio unit is configured to transmit a radio signal to the radio unit of at least the second release mechanism for actuating the second release mechanism, and the release mechanism, and respectively the radio unit are configured to have the following switching states:

a1) the intrinsic actuation mechanism upon an intrinsic manual actuation only activates the intrinsic actuation mechanism of the release mechanism and is not able to send any radio signal to a further release mechanism, or a2) the intrinsic actuation mechanism upon an intrinsic manual actuation activates the intrinsic actuation mechanism of the release mechanism, and is configured to transmit a radio signal to a further release mechanism, and b1) the extrinsic actuation mechanism activatable by an extrinsic actuation from a radio signal received from a further release mechanism, or b2) the extrinsic actuation mechanism is by a radio signal received from a further release mechanism.

3. The release mechanism according to claim 2, wherein the release mechanism, is provided with at least one first switch for setting the two switching states a1) and a2), and at least one second switch for setting the two switching states b1) and b2), or is provided with at least one switch enabling setting of the switching states to a1 b1, a1 b2, a2 b1 and a2 b2.

4. The release mechanism according to claim 3, wherein the set switching states are indicated by the position of the switches and/or by one or more optical display means.

5. The release mechanism according to claim 2, wherein the release mechanism is provided with a push-button switch and the switching states are indicated by one or more optical display means.

6. The release mechanism according to claim 2, wherein, the release mechanism is provided with a securing device that locks the at least one switch in the set position.

7. The release mechanism according to claim 1, wherein the release mechanism comprises a handle.

8. The release mechanism according to claim 1, wherein the the extrinsic actuation mechanism comprises an ignition unit which emits a pressurized fluid upon actuation.

9. The release mechanism according to claim 1, comprising a sensor which responds upon the intrinsic actuation of the release mechanism.

10. The release mechanism according to claim 1, wherein, the radio unit is configured to receive a first additional radio signal from a further radio device, and the extrinsic actuation of the release mechanism is induced upon the radio receiving said first additional radio signal.

11. The release mechanism according to claim 1, wherein, the radio unit is configured to receive a second additional radio signal from a further radio device and blocks the extrinsic actuation mechanism and/or intrinsic manual actuation, or, if a blocking is set, unlocks same upon receiving said additional radio signal.

12. The release mechanism according to claim 1, comprising an additional holding and securing device which is connectable to a device for rescuing or for indicating the position of persons in avalanches and for reducing the extent to which persons swept away by avalanches are buried, or to the person actually wearing the release mechanism, can assume at least two positions, namely a secured position, in which it encloses the release mechanism such that same can no longer be grasped and actuated manually, and an actuating position, in which the release mechanism may be grasped and actuated manually.

13. The release mechanism according to claim 12, wherein the holding and securing device and the release mechanism are each provided with a blocking device and interact in the secured position such that the radio unit is blocked or switched off and/or the holding and securing device constitutes a flexible oblong flap.

14. The release mechanism according to claim 12, wherein the blocking device of the holding and securing device is a magnet which comes to rest in the secured position on a therewith cooperating electronic component in the release mechanism.

15. The release mechanism according claim 1, in combination with a device for rescuing persons from avalanches which comprises at least one tear-resistant balloon which can be secured to the user via a connection close to his/her body, and which in a rescue operation is inflated with pressurized gas so that it keeps its user at the avalanche surface like a buoyant body, and a filling apparatus for connecting the balloon to at least on pressurized gas container, said filling apparatus having a device for opening the container and which communicates with a filling opening of the balloon, wherein the pressurized gas container with the filling apparatus is directly secured to the body by a fastener, independently of the balloon, or is indirectly secured to the user's body via clothing or other objects worn on the body.

16. The release mechanism according to claim 1, wherein the radio unit comprises an antenna configured to receive a radio signal for actuating the intrinsic actuation mechanism from a radio unit of at least one further release mechanism.

* * * * *

UNITED STATES PATENT AND TRADEMARK OFFICE

CERTIFICATE OF CORRECTION

PATENT NO. : 8,494,480 B2
APPLICATION NO. : 12/663966
DATED : July 23, 2013
INVENTOR(S) : Peter Aschauer et al.

It is certified that error appears in the above-identified patent and that said Letters Patent is hereby corrected as shown below:

In the Claims:

Column 13, line 28 of claim 2, "b2) the extrinsic actuation mechanism is by a radio signal" should read --b2) the extrinsic actuation mechanism is not activatable by a radio signal--

Column 13, line 49 of claim 8, "the the extrinsic actuation" should read --the extrinsic actuation--

Column 14, line 41 of claim 15, "at least on pressurized gas container" should read --at least one pressurized gas container--

Signed and Sealed this
Thirteenth Day of January, 2015

Michelle K. Lee
*Deputy Director of the United States Patent and Trademark Office*